Aug. 2, 1960     A. J. BAKER     2,947,035
MOLDING AND JOINING HEAD ON COLLAPSIBLE TUBE
Filed March 28, 1955
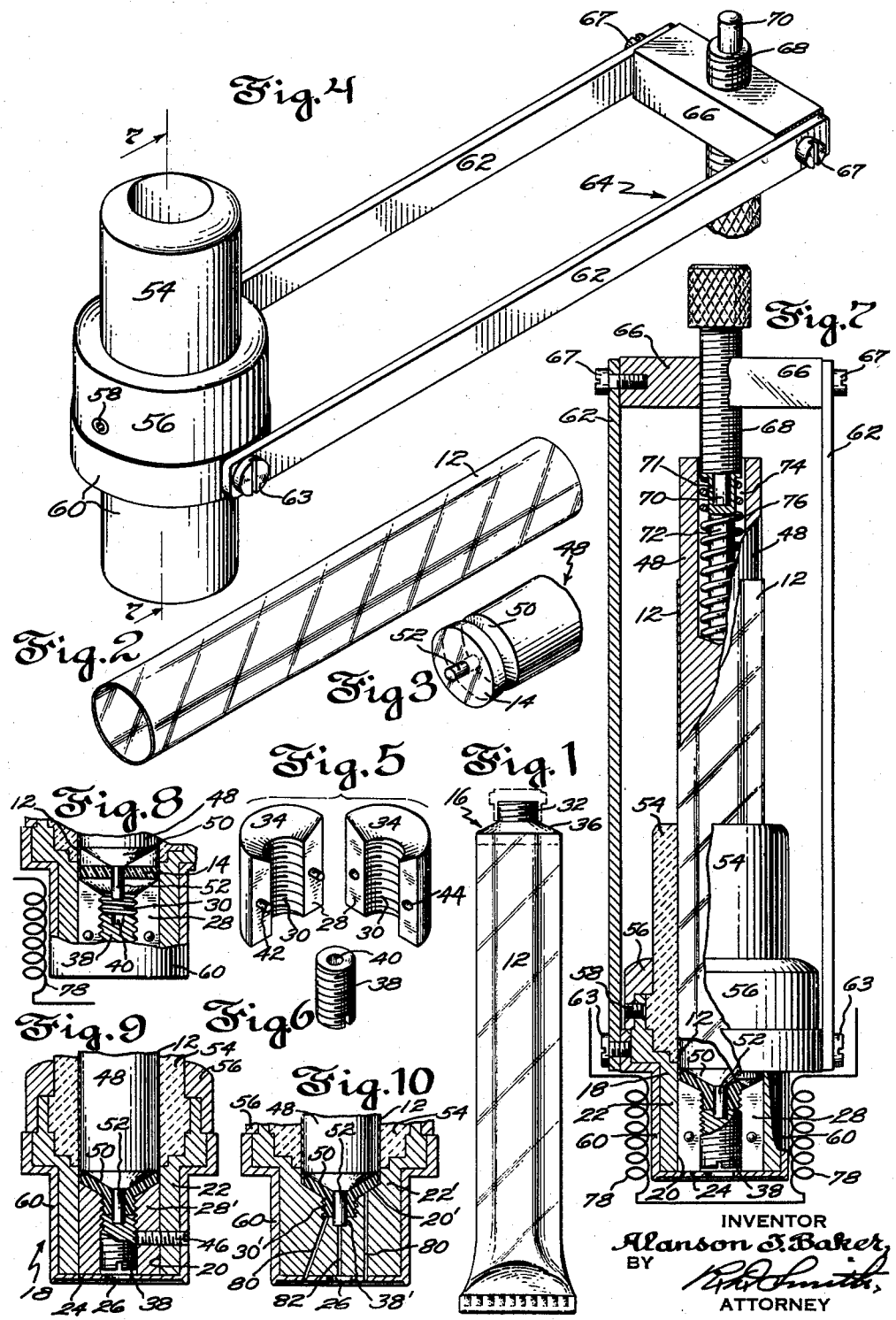
INVENTOR
Alanson J. Baker,
BY
ATTORNEY United States Patent Office 2,947,035
Patented Aug. 2, 1960

2,947,035
MOLDING AND JOINING HEAD ON COLLAPSIBLE TUBE

Alanson J. Baker, 307 S. William St., Johnstown, N.Y.

Filed Mar. 28, 1955, Ser. No. 497,016

6 Claims. (Cl. 18—36)

This invention relates to a method of and means for fabricating from plastic material a hollow squeeze container for holding and dispensing creamy substances such as tooth paste comprising an elongate collapsible thin walled flexible tubular barrel united to an externally threaded thick walled headpiece incorporating a discharge passageway through which the contents are progressively dispensed by squeezing the tubular barrel.

An object of the invention is to mold the threaded headpiece in the same operation or series of method steps by which it is joined to the elongate collapsible tubular barrel of the container.

Another object is to confine the headpiece entirely to within the outer diameter of a cylindrical tubular barrel so that said outer diameter constitutes the maximum overall girth of the completed dispensing container.

Another object is to perform simultaneous molding and joining of the head to the barrel with the aid of molding apparatus so constructed as to permit quick and convenient stripping of the finished container from the mold.

A further object is so to construct the molding apparatus that it shall be portable thereby to be insertable in and removable from a heat generating station or zone made use of in the molding operation.

A further object is to so section the mold that a portion of the mold proper containing the screw thread, forming portion of the mold cavity is removable from the mold along with the finished container thereafter to be removed from the article for restoration to the mold proper in empty condition for use in subsequent molding operations.

A further object is to provide the portable mold with manually operable pressure exerting means capable of subjecting uncured molten molding material to a compressive molding force while confined within the mold cavity.

These and other objects and advantages of the improvements will become clear in the following description of method steps and apparatus which are ways and means for practicing the invention, the description having reference to the appended drawings wherein:

Fig. 1 is a side view of a collapsible dispensing container comprising a tubular barrel and a headpiece having a threaded neck molded to shape and united with the tubular barrel simultaneously by the practice of this invention, a closure screw cap being indicated in broken lines.

Fig. 2 is a perspective view of the prefabricated tubular barrel before jointure with the headpiece.

Fig. 3 shows a charge of molding material in the form of a washer-like preform lodged on the molding end face of a plunger mandrel before being converted into the headpiece of the product.

Fig. 4 is an exterior perspective view of a portable mold with an accessory attachment for manually applying molding pressure to the mandrel of Fig. 3.

Fig. 5 shows the separated parts of a core die that is insertable in and removable from a well in the mold of Fig. 4.

Fig. 6 shows a screw plug that is adjustable lengthwise in a threaded hole through the core die of Fig. 5 thereby to define the axial length of the threaded neck portion of the headpiece.

Fig. 7 is a view taken partially in central vertical section on the plane 7—7 in Fig. 4 showing the tubular barrel of Fig. 2 and the mandrel of Fig. 3 and all other parts of the mold in their relationship after conversion of the charge of molding material into the shape of the headpiece of the finished product.

Fig. 8 is a fragmentary view showing assembled parts of the molding apparatus of Fig. 7 before the preform of molding material has been converted into the shape of the headpiece.

Fig. 9 is a sectional view like Fig. 7 showing a modified form of removable core die constituting a solid unsplit tubular body.

Fig. 10 shows a still further modified construction of the mold body wherein the parts of Figs. 6 and 7 are omitted, and sprues are substituted for injection molding.

Method steps by which the present invention can successfully be practiced and improved apparatus useful in the practice thereof are illustrated in the drawings with reference, as one example, to the use of a preformed charge of plastic molding material that can be converted under heat and pressure into a relatively thick walled headpiece having a threaded neck 32 and simultaneously united with a prefabricated relatively thin walled tubular barrel 12 to produce the collapsible dispensing container of Fig. 1. The invention contemplates other and more conventional ways and means of forcing molding material to fill a space in a mold cavity, as by simple injection molding to form the headpiece and unite it to the tubular barrel. In whatever way the charge of molding material is caused to fill the mold cavity these improvements afford the unique accomplishment of at one and the same time molding to shape the headpiece such as 16 and uniting it to the tubular barrel 12 in such manner that the headpiece does not externally overlap the tubular barrel nor extend to a greater girth than the latter and further so that there will result an airtight welding or knitting together of the joined edges of the headpiece and of the barrel constituting a seal that cannot be separated by mechanical means unless the mechanical action applied is of such nature that it will tear or damage the material itself.

In the herein illustrated kind of apparatus that may be used as an aid in practicing my improved method a mold body proper 18 contains a well 20 encompassed and bordered by a cylindrical wall 22 and bottomed by a transversely extending floor wall 24 containing an aperture 26 to prevent trapping of air in the well. While such floor wall as herein illustrated is formed by an armoring shell 60 it may instead be integral with the wall 22.

Slidably fitting the cylindrical wall 22 of well 20 there is a cylindrical core die 28 having a smooth external surface and containing a central, axially extending, screw-threaded hole 30 to serve as a portion of the mold cavity for forming the externally threaded neck 32 of headpiece 16. The top end of die 28 is concavely conical at 34 to form the tapering shoulder surface 36 of the headpiece 16.

A portion of the threaded hole 30 is plugged by a threaded stud 38 that has screw engagement therewith so as to be axially adjustable in hole 30 to vary and determine the length of the threaded neck 32 of the headpiece. Stud 38 has a central socket 40 in its top end that serves as a stop abutment for the core pin 52 that forms the tip end of a mandrel 48 wherefore to determine the thickness of the conical wall 36 that is to be imparted to the headpiece 16 in the molding process.

Whereas in Fig. 5 die 28 is shown to be split and separable on a diametrical plane and equipped with jointure dowels 42 and dowel holes 44, it can instead be made as an integral solid piece shown at 28' in Fig. 9. The screw variable setting of stop stud 38 in die 28 can be maintained by a set screw 46.

In addition to the hollow mold body 18 and core die 28 I employ a forming means or plunger mandrel 48 that slidably fits the internal diameter of tubular barrel 12 with sufficient closeness to prevent the latter from collapsing from true cylindrical shape yet with sufficient looseness freely to permit lengthwise movement of the mandrel relative to the barrel. The leading end portion of mandrel 48 is provided with a conical end face 50 terminating in the aforesaid core pin 52 which by being received into and bottoming against the blind end of stop socket 40 in stud 38 definitely limits the approach of plunger mandrel 48 toward the mold body and thus regulates or predetermines the thickness of the conical wall 36 of headpiece 16. Mandrel 48 may be of aluminum.

Fig. 3 shows the molding material preformed as a blank in the shape of a washer of self-sustaining shape ringing the core pin 52 on the leading end of mandrel 48 and is of somewhat smaller diameter than the cylindrical shank of the mandrel and hence freely slidable along and relatively to barrel 12.

Since heat is to be applied to the well region in the mold body during the molding process I prefer to equip the mold with a rigid tubular slide bearing extension 54 of heat proof and heat insulative material such as Bakelite which will retard the transfer of heat from the mold body to the mandrel. Such slide bearing extension can be held in rigid relation to the mold body by lodging it in a cup-shaped seat in the latter and clamping it removably therein by means of a retaining ring 56 held removably to the mold body by a set screw 58. The internal bore of slide bearing extension 54 matches in size, and forms a smooth tubular continuation of, the internal cylindrical surface of well 20 in the mold body.

For applying pressure endwise to the mandrel 48 in the molding process the mold body is equipped with accessory apparatus comprising an armoring shell 60 to which, at diametrically opposite points, there is pivotally coupled by shoulder screws 63 the swingable arms 62 of a yoke or bail structure 64, said arms being bridged and connected at their free ends by a swivel bar 66 that is pivotally connected to the arms 62 at its ends by shoulder screws 67 and thus free to swivel on its own longitudinal axis. In threaded engagement with bar 66 and extending therethrough is a pressor thumbscrew 68 whose pilot tip 70 enters a flanged thrust cup 71 that floats on the top end of a compression spring coil 76 which bottoms in a socket 74 in the outer end of mandrel 48. A check pin 72 floats lengthwise between the bottom end of cup 71 and the bottom end of socket 74 and thus limits the extent of compression that can be imparted to spring 71 by the thumbscrew 68. Thus spring 71 transmits to mandrel 48 the thrust of the thumbscrew 68 thereupon and if the compressible yielding of spring 71 is entirely overcome, the check pin 72 will directly transmit to the mandrel all thrust power that the thumbscrew is capable of exerting when turned manually by grasping its knurled end.

Fig. 10 shows a modified construction of the mold body wherein the mold 20 and die 28 are dispensed with and the solid mold body 18' is directly threaded at 30' to form the threads 32 on the neck of the product article. Here the stop socket 40 is contained directly in the mold body 18' and is receptive to the core pin 52 on mandrel 48. A relief hole 82 prevents trapping of air. The mold body 18' of Fig. 10 may be split so as to be separable on a diametrical plane for releasing the threaded neck 32 from the mold. This, however, is more apt to leave a fin or flash on the threads of neck 32 than when the threaded core die of Fig. 5 is removed from the mold well with the work and then removed from the work by unscrewing. Sprues 80 are for injection molding.

In operation the bail 64 is swung to one side as shown in Fig. 4 to enable the mandrel 48, together with the barrel 12 sleeved thereon and with the preformed charge or blank 14 lodged thereon as is shown in Fig. 3, to be inserted endwise into the mouth of mold well 20 as shown in Fig. 8. The inserted leading end portion of the tubular barrel is thereby brought into abutment with the conically tapering annular shelf in the mold well. Next the bail 64 is swung into parallel alignment with mandrel 48 so as to straddle the outermost end thereof and pressor screw 68 is turned until it enters the socket 74 in the end of the mandrel and exerts thrust on the spring 76 through the medium of cup 71.

The entire work carrying apparatus of Fig. 7, being portable, may be maneuvered by hand and its base portion and the well containing region of the mold now placed in a zone of heat concentration derived from the induction heating coil 78. The heat thus delivered will soften or melt the preformed charge 14 of molding material to a flowable consistency. Other suitable ways of heating the mold cavity may be employed. The softened or melted and flowable molding material in the preform 14 is forced to thoroughly fill the molding space that is bounded by the well surrounding walls 22 of the mold body, by the threaded hole in die 28, by the tapering end of the mandrel 48 and by the exposed internal cylindrical surface of the tubular wall of the end portion of tubular barrel 12 when the pressor screw 68 is screwed inward against the yielding resistance of spring 76 until advancing movement of the end face 50 of mandrel 48 is checked by abutment of its core pin 52 against plug 38. Thus there is predetermined the dimension of such space that will determine the thickness of the conical wall 36 of the headpiece.

By the foregoing method and at one and the same time the shape of headpiece 16 is formed and its peripheral edge becomes integrally joined by fusion with solely the internal cylindrical surface of the tubular wall of the end portion of tubular barrel 12 whereupon the outer diameter of the barrel remains unchanged at its junction with the headpiece and constitutes the overall girth of the finished product of Fig. 1. In the operation described the inner end of the thermoplastic tubular barrel 12 becomes temporarily softened by the described application of heat but mandrel 48 is isolated from such heat by the heat insulative properties of slide bearing 54. Core pin 52 further forms the passageway or outlet orifice in the headpiece 16 through which the contents of the container are dispensed by squeezing it.

With the parts positioned as in Fig. 7 the mold is withdrawn from the induction heating coil 78 and allowed to cool, or is quenched with a coolant to speed the setting and hardening of the joined plastic materials of the headpiece and tubular barrel. Unscrewing of the pressure screw 68 and retractive swinging of the bail 64 to its position in Fig. 4 frees the mandrel 48, the united headpiece 16 and tubular barrel 12 and the core die 28 with its plug 38 for withdrawal in unison from the mold well 20, after which the core die 28 in unison with its plug 38 is unscrewed from the threaded neck 32 of the product ready for immediate restoration to the well 20 for the next molding operation.

Another way of forcing plastic molding material to fill the space bounded by the wall 22' of the mold cavity 20', the end face 50 of the mandrel, and the exposed end portion of the internal surface of the tubular barrel 12 is to inject plastic molding material into said space through a sprue hole or holes 80 indicated in Fig. 10 which may or need not be present in the forms of the apparatus illustrated in Figs. 1 to 9, inclusive. Independent heating of the mold itself may or need not be resorted to if injection molding is practiced. Such heating if supplied will serve the advantageous purpose of softening and preparing the end of the tubular element for a more homogeneous jointure with the freshly molded headpiece if barrel 12 is of thermoplastic material.

The tubular barrel 12 may be prefabricated in well known ways as by injection molding or by the tube extrusion process and no apparatus need be shown herein for producing the same. Both this barrel and/or the headpiece 16 may be molded from polyethylene or other synthetic plastic material including Astralon, believed to be a registered trademark or from polymerization products of vinyl chlorides or acetylene derivatives, polystyrene, acrilic acid esters, etc. depending on the use intended for the collapsible dispensing container of Fig. 1. It may be used to contain and dispense pharmaceutical and chemical preparations, shaving, cosmetic or medical creams, consumable foods, etc., suitable to the properties of the plastic materials of which it is made.

I prefer to make the mold body 22 of steel and the armoring shell 60 of brass. Shell 60 may be made integral with floor wall 24 and freely removable from the mold walls 22.

Departure from the particular materials made of mention herein is contemplated by all of the appended claims which are not limited in their terms to some certain material and within the intended coverage of the claims many well understood substitutes can be made for the particular shapes and arrangement of parts herein shown.

I claim:

1. In the fabricating of components of a dispensing container the method of converting a preformed blank of thermoplastic material of self-sustaining shape into a headpiece composed entirely of said material of the blank and having fused joinder to the internal cylindrical wall surface of a preformed open ended tubular barrel of thermoplastic material which comprises the steps of, providing said barrel with an internal supporting mandrel of size to be freely slidable within and lengthwise of said barrel, mounting on the advance end portion of said mandrel a preformed blank of thermoplastic molding material of self-sustaining shape in a manner to be supported solely by and travel with said mandrel while the latter slides relatively to said advance end portion of said barrel, presenting into barrel arresting abutment with the advance end of only said barrel an annular shelf within a mold cavity sufficiently spacious to afford entrance to said cavity for said advance end portion of the barrel and for said mandrel and said body of molding material, applying sufficient heat to said cavity to soften said blank, and while said barrel remains arrested by said shelf advancing said mandrel and its carried blank of molding material a limited distance into said mold cavity that leaves exposed to said cavity a substantial area of said internal cylindrical wall surface of said leading end portion of said barrel, said distance being sufficient to deform said softened body of molding material into full conformity with a substantially closed space bounded by said leading end of the mandrel and by said exposed area of the internal cylindrical wall surface of said barrel and by the walls of said cavity, thereby to mold by pressure of said mandrel a headpiece composed of only the material of said preformed blank of molding material and bond the same into heat fused joinder to said exposed area of the internal cylindrical wall surface of said barrel.

2. In the fabricating of components of a dispensing container the method of forming and joining a headpiece on a preformed open ended tubular barrel of thermoplastic material which comprises the steps of, providing said barrel with an internal supporting mandrel of size to be freely slidable lengthwise of said barrel, mounting on the advance end of said mandrel a preformed blank of molding material in a manner to be held by and travel with said mandrel while the latter slides relatively to said advance end of said barrel, presenting into arresting abutment with the advance end of only said barrel an annular shelf within a mold cavity having metallic walls and sufficiently spacious to afford entrance to said cavity for said advance end of the barrel and for said mandrel and said blank of molding material, guiding a co-extensive length of said barrel and mandrel for rectilinear lengthwise movement in a slide bearing of substance relatively nonconductive of heat extending outward from said open mouth of said mold cavity operative to retard conductance of heat from said cavity to said length of said mandrel, applying heat to said cavity but not to said slide bearing to soften said blank, advancing said mandrel and body endwise a sufficient distance into said mold cavity to convert said softened blank into conformance with the shape of said mold cavity and of said end of the mandrel and simultaneously into heat fused joinder with said barrel, and removing said heat from said cavity to harden and set said barrel and headpiece permanently in conjoined relation.

3. In the fabricating of components of a dispensing container the method of forming and joining a headpiece on a preformed open ended tubular barrel of thermoplastic material which comprises the steps of, providing said barrel with an internal supporting mandrel of size to be freely slidable lengthwise of said barrel and having an advance end, mounting on the advance end of said mandrel a preformed blank of molding material in a manner to be held by and travel with said mandrel while the latter slides relatively to said advance end of said barrel, presenting into arresting abutment with said advance end of only said barrel an annular shelf within a mold cavity sufficiently spacious to afford entrance to said cavity for said advance end of said barrel and for said mandrel and said blank of molding material, presenting into arresting abutment with said advance end of said mandrel a positive stop, applying resilient pressure through said mandrel and against said blank in a direction to thrust said mandrel and blank a sufficient distance into said mold cavity predetermined by a said stop to cause said blank to conform to said mold cavity while said barrel remains arrested by said rim of said well.

4. Apparatus for forming and joining a threaded head on a collapsible tubular barrel of thermoplastic material by pressure molding, comprising a mold block containing an open ended cavity forming well, an internally threaded hollow core die peripherally fitting said well in a manner to be slidably removable from said well through the open end thereof, a plunger mandrel of less girth than said well insertable endwise in the latter in a direction to approach said core die means to support said core die against the thrust by said mandrel when subjected thereto.

5. Apparatus as defined in claim 4, in which the said mold block is substantially smaller in girth near the bottom of the said well than near the said open end thereof, wherefore to place the said core die in optimum intimacy with a source of heat outside said mold block while occupying said well.

6. Apparatus as defined in claim 4, in which the said core die contains a threaded hole extending axially therethrough a portion of whose length forms a molding cavity, together with a plug having threaded engagement with and filling the remainder of said length of the threaded hole thereby to define an adjustable end for the cavity forming portion of said length.

References Cited in the file of this patent

UNITED STATES PATENTS

| 1,754,496 | Barker | Apr. 15, 1930 |
| 2,118,893 | Meebeck | May 31, 1938 |
| 2,562,523 | Brunet | July 31, 1951 |
| 2,673,374 | Strahm | Mar. 30, 1954 |
| 2,695,423 | Pardee et al. | Nov. 30, 1954 |

FOREIGN PATENTS

| 523,287 | Belgium | Oct. 31, 1953 |
| 54,793 | Netherlands | May 16, 1943 |
| 270,613 | Switzerland | Sept. 15, 1950 |